United States Patent
Köpp et al.

(10) Patent No.: US 7,075,888 B1
(45) Date of Patent: Jul. 11, 2006

(54) METHOD FOR OPERATING INTERFACE MODULES IN AN ATM COMMUNICATIONS DEVICE

(75) Inventors: Jörg Köpp, München (DE); Rudolf Stelzl, Dachau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/857,926

(22) PCT Filed: Dec. 1, 1999

(86) PCT No.: PCT/DE99/03808

§ 371 (c)(1),
(2), (4) Date: Jun. 11, 2001

(87) PCT Pub. No.: WO00/35150

PCT Pub. Date: Jun. 15, 2000

(30) Foreign Application Priority Data

Dec. 9, 1998 (DE) ................................ 198 56 835

(51) Int. Cl.
*H04L 12/26* (2006.01)
(52) U.S. Cl. ..................................... 370/218
(58) Field of Classification Search ................ 370/395, 370/256, 231, 235–236.2, 216–220, 225, 370/227–229, 395.1, 221, 222, 223, 224, 370/398
See application file for complete search history.

(56) References Cited

U.S. PATENT DOCUMENTS

| 6,091,730 | A | * | 7/2000 | Biegaj et al. ............. 370/395.2 |
| 6,111,858 | A | * | 8/2000 | Greaves et al. ............. 370/256 |
| 6,714,544 | B1 | * | 3/2004 | Bosloy et al. ........... 370/395.1 |

OTHER PUBLICATIONS

XP-000720548—Redundancy Concepts for a Large ATM Switching Node, Rathgeb, pp. 425-433.
XP-000657033—The MainStreetXpress Core Services Node—a Versatile ATM Switch Architecture for the Full Service Network, Rathgeb et al.

* cited by examiner

*Primary Examiner*—Kwang Bin Yao
(74) *Attorney, Agent, or Firm*—Bell, Boyd & Lloyd LLC

(57) ABSTRACT

A method for operating interface modules in an ATM communications device wherein interface modules which can be specified as active and/or redundant are connected to a central control unit. Control commands provided for this purpose are transmitted approximately simultaneously from the central control unit to the active and the redundant interface module during the establishment and clearing of at least one virtual connection, and the redundant interface module does not acknowledge receipt of the control commands. The load on the interface module is thus dynamically relieved.

3 Claims, 1 Drawing Sheet

METHOD FOR OPERATING INTERFACE MODULES IN AN ATM COMMUNICATIONS DEVICE

BACKGROUND OF THE INVENTION

1. Field of the Invention

The present invention relates to a method for operating interface modules, which can be specified as active and/or redundant, in an ATM communications device, in which the interface modules, which can be specified as active and/or redundant, are connected to a central control unit.

2. Description of the Prior Art

In communications devices, in particular communications devices that operate using the asynchronous transfer mode, virtual connections are often established, maintained and terminated via interface modules with the aid of a central control unit. The central control unit is used here, in particulars to transmit control commands to establish and clear virtual connections to the interface modules.

In order to ensure disruption-free operation and to enable rectification of errors in an active interface module, redundant interface modules and/or redundant transmission paths are provided. If one interface module or transmission path fails, the communications link, in particular a virtual connection, is rerouted to a redundant interface module and/or transmission link. Depending on the level of fail-safety required for a communications device or transmission link, it is possible to provide different redundancy structures for the associated interface module. Examples of these are "1+1", "1:1" and "1:N" interface module redundancy, cf. in particular "IEEE Journal on Selected Areas in Communications", VOL. 15, No. 5, June 1997, pages 795 to 806.

With a "1+1" redundancy structure, two interface modules are operated in parallel in order for communication signal streams to be transmitted via them redundantly. Of these communication signal streams transmitted redundantly, only one is used for the further processing of the virtual connection.

With "1:1" interface module redundancy, only one of two interface modules is used as the active interface module, with a switchover being made to the remaining redundant interface module only if the active interface module fails.

With "1:N" interface module redundancy, one redundant interface module is additionally provided for a number N of interface modules. If an error occurs in one of the N interface modules, a switchover is then made to the redundant interface module instead.

With "1:N" interface module redundancy, a selector arrangement is usually connected between the interface modules and the external transmission lines; the selector can allocate the individual transmission lines to the N interface modules and the redundant interface module. It should be noted however that if a selector arrangement fails, or in the event of the selector arrangement being consequently exchanged, all transmission lines connected thereto and the connections they carry are interrupted.

In current communications systems, the central control unit transmits control commands solely to the active interface module, and the active interface module communicates the control commands to the redundant interface module using a communications channel. The active interface module is notified of the receipt of the respective control commands by the redundant interface module. In addition, the active interface module notifies the central control unit of receipt of the control commands only once the control commands have been acknowledged by the redundant interface module. As a consequence, each control command is processed twice by the active interface module during connection establishment or clearing, resulting in a considerable additional dynamic load on the interface module.

An object of the present invention therefore, is to reduce the dynamic load of interface modules, which can be specified as active and/or redundant, in an ATM communications device.

SUMMARY OF THE INVENTION

Accordingly the method of the present invention transmits the control commands, provided for the establishment and clearing of at least one virtual connection, approximately simultaneously from the central control unit to the active and the redundant interface module, and the central control unit is not notified by the redundant interface module of receipt of the control commands. The approximately simultaneous transmission of the control commands to the active and redundant interface module dispenses with the need for direct communication between the active and redundant module, and performance is improved as a result of shorter connection establishment and clearing times. Furthermore, the load on the communications channels provided for the exchange of information between the active and redundant interface module is dynamically relieved, and communication capacities of the communications channel are consequently available for additional applications.

Additional features and advantages of the present invention are described in, and will be apparent from the following Detailed Description of the Preferred Embodiments and the Drawings.

DETAILED DESCRIPTION OF THE PREFERRED EMBODIMENTS

Figure 1:
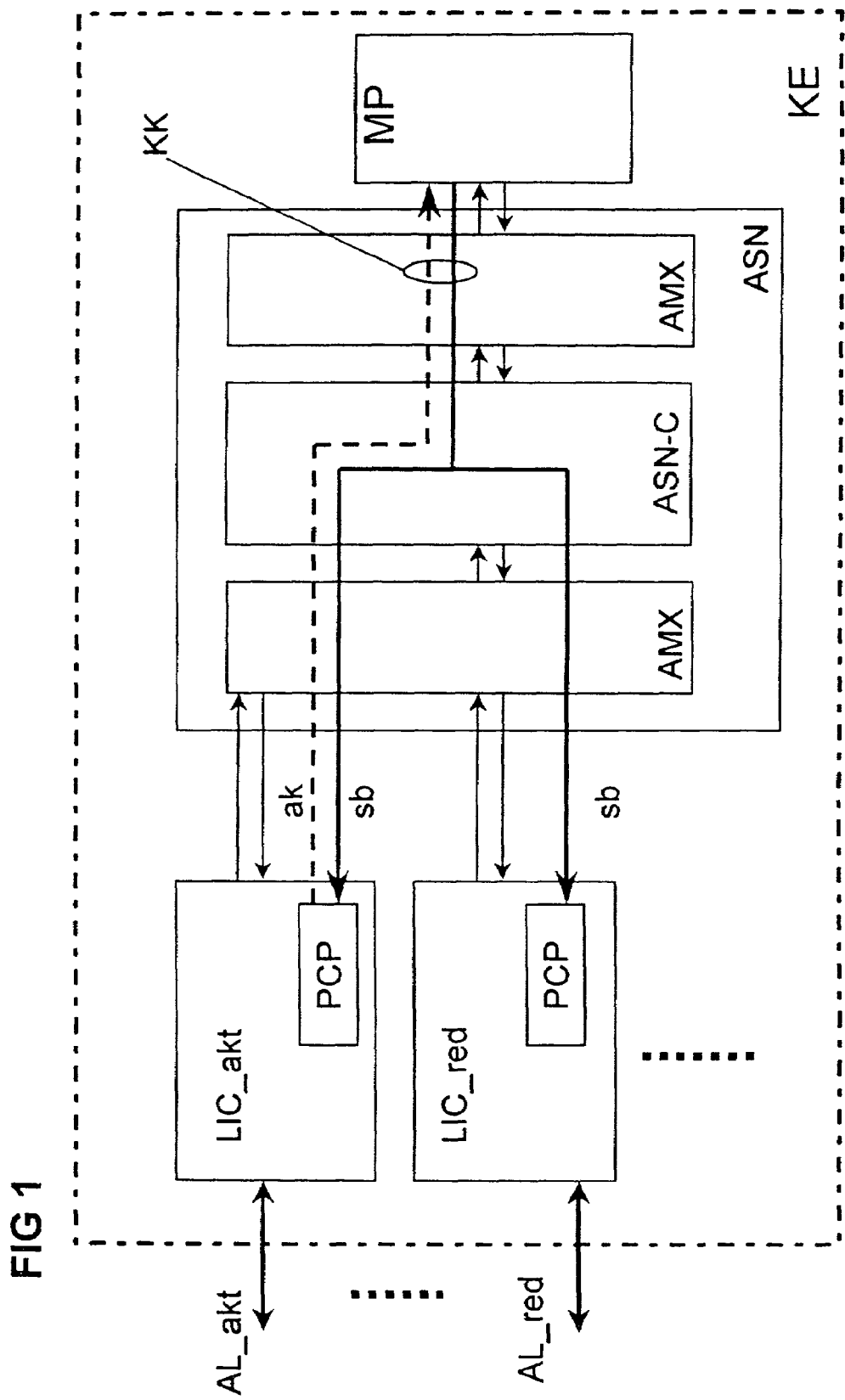
FIG. 1 shows a block circuit diagram of an ATM communications device to which the method of the present invention is directed.

FIG. 1 shows an ATM communications device KE which operates using the asynchronous transfer mode and which enables the transmission of ATM cells over virtual connections. The ATM communications device KE has a central switching network ASN which has a central switching arrangement ASN-C (ASN core) and at least one ATM multiplexing device AMX connected to the switching arrangement ASN-C.

Connected to the central switching network ASN, specifically to the central switching arrangement ASN-C, via an ATM multiplexing device AMX is an associated central control unit MP, which is provided inter alia for the establishment of virtual connections. In the present exemplary embodiment, a number of interface modules LIC_akt, . . . , LIC_red are also connected, for example by means of via bidirectional connections, to the central switching network ASN via an ATM multiplexing device AMX, with the interface modules LIC_akt, . . . , LIC_red being provided, in each case, for the connection of at least one of a number of peripheral transmission lines AL_akt, . . . , AL_red. The transmission lines AL_akt, . . . , AL_red are moreover designed for a bidirectional transmission of ATM cells.

The interface modules LIC_akt, . . . , LIC_red are connected via an associated communications channel KK to the central control unit MP, and control commands sb are transmitted from the central control unit MP to the interface modules LIC_akt, . . . , LIC_red via the communications channel KK.

The present exemplary embodiment shows an ATM communications device KE having "1+1" interface module redundancy, in which one active and one redundant interface module LIC_akt LIC_red are operated in parallel; that is, the same connection data are transmitted over the redundant interface module LIC_red as over the associated active interface module LIC_akt. FIG. 1 shows one active and one redundant interface module by way of example. However, only one of the two ATM cell streams are used for the further processing of the virtual connection. Each interface module LIC_akt, . . . , LIC_red also has a module-specific control unit PCP which receives control commands sb from the central control unit MP over the communications channel KK.

According to the present invention, the control commands sb provided for the establishment and clearing of a virtual connection are transmitted approximately simultaneously from the central control unit MP to the active and redundant interface module LIC_akt, LIC_red over the communications channel KK, and the central control unit MP is not notified by the redundant interface module LIC_red of receipt of the control commands sb. In contrast, the active interface module LIC_akt notifies the central control unit MP of receipt of the control command sb over the communications channel KK using an "Acknowledge" message ak.

The approximately simultaneous transmission of the control commands sb to the active and redundant interface module LIC_akt, LIC_red ensures that both interface modules LIC_akt, LIC_red are driven approximately simultaneously into the same operating state, and it is consequently possible to switch over to the functioning, redundant interface module LIC_red within a very short period of time if the active interface module LIC_akt fails.

Application of the method according to the present invention is not restricted to "1+1" interface module redundancy, but can be used with different redundancy concepts employed in ATM communications devices KE. This includes both interface module redundancy and transmission link redundancy.

Indeed, although the present invention has been described with reference to specific embodiments, those of skill in the art will recognize that changes may be made thereto without departing from the spirit and scope of the invention as set forth in the hereafter appended claims.

The invention claimed is:

1. A method for operating interface modules in an ATM communications device, wherein the interface modules are connected to a central control unit, the method comprising the steps of:
   specifying each of the interface modules as one of active and redundant;
   providing control commands for establishment and clearing of at least one virtual connection between the central control unit and the interface modules; and
   transmitting the control commands approximately simultaneously from the central control unit to the active and the redundant interface modules;
   wherein the central control unit is notified of respective receipt of the control commands only by the active interface modules.

2. A method for operating interface modules in an ATM communications device as claimed in claim 1, wherein no additional synchronization of the redundant and active interface modules is performed.

3. A method for operating interface modules in an ATM communications device as claimed in claim 1, wherein the procedures provided for controlling the active and redundant interface modules are processed approximately concurrently.

* * * * *